April 19, 1949.　　　　E. PELL ET AL　　　　2,467,986
ALTERNATING CURRENT MOTOR DRIVE AND CONTROL
Filed Sept. 23, 1944　　　　　　　　　　　　3 Sheets-Sheet 1
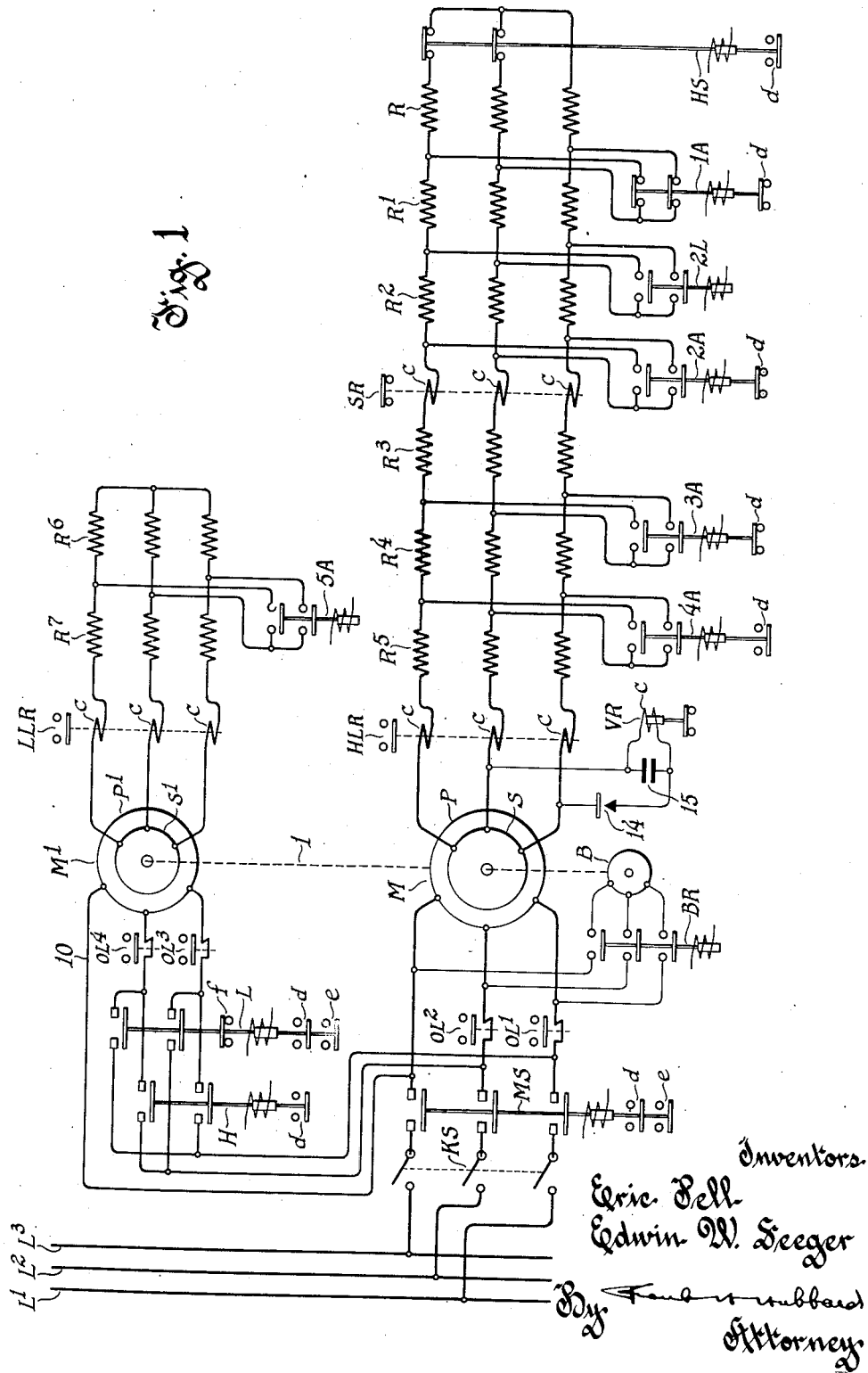

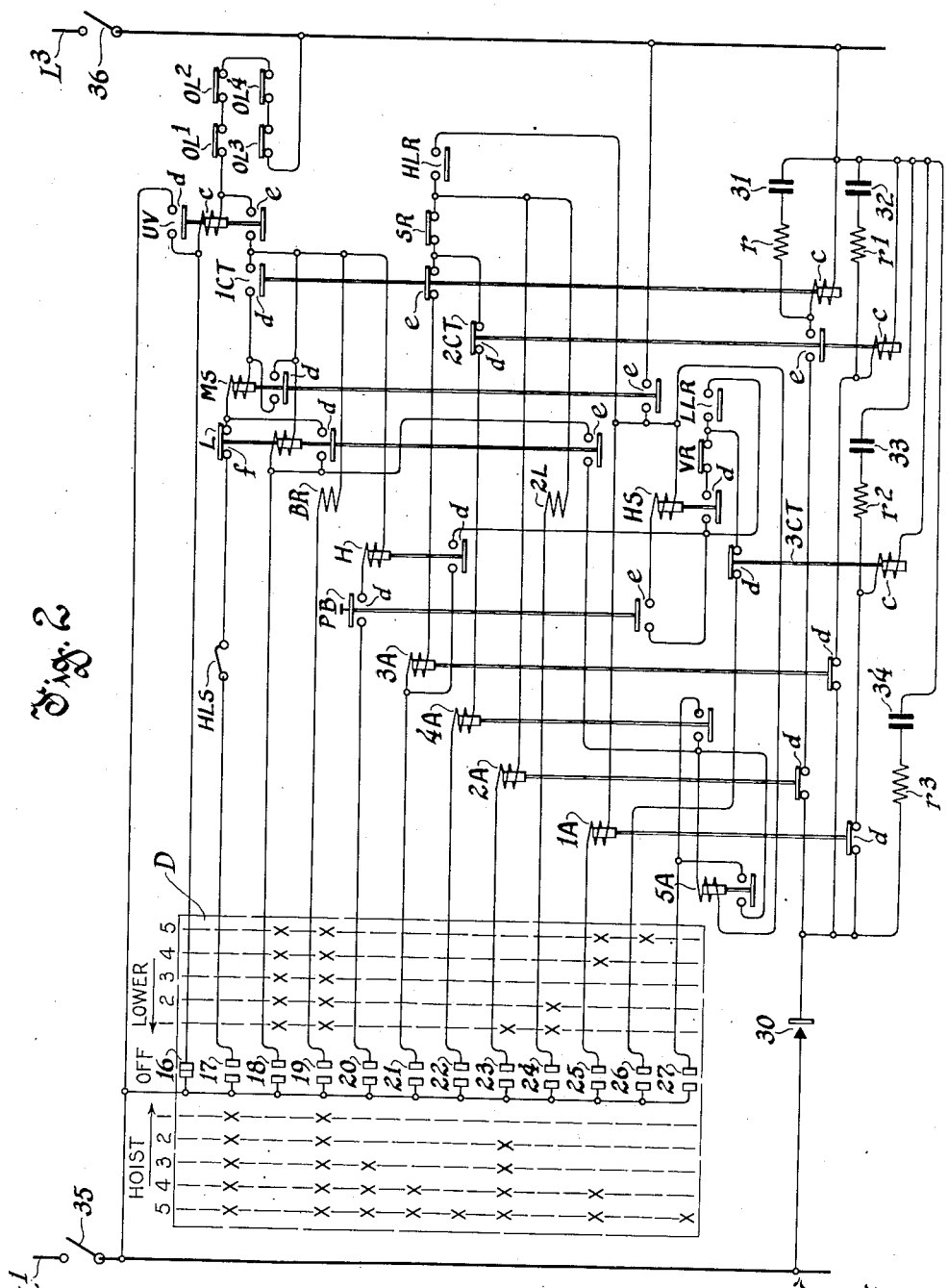

April 19, 1949.  E. PELL ET AL  2,467,986
ALTERNATING CURRENT MOTOR DRIVE AND CONTROL
Filed Sept. 23, 1944  3 Sheets-Sheet 3
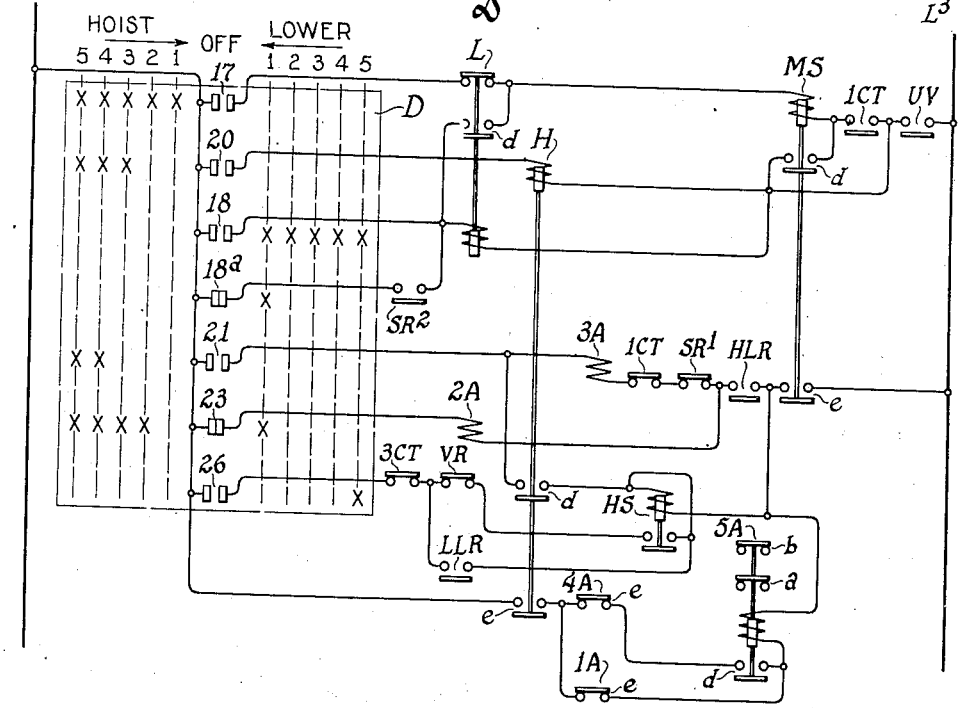
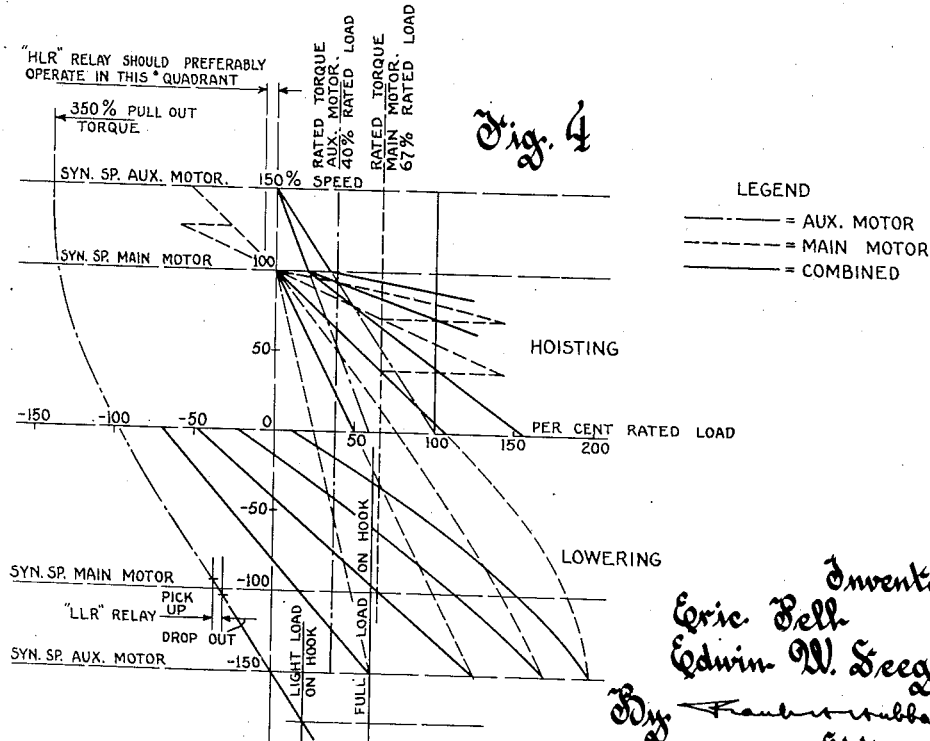

Patented Apr. 19, 1949

2,467,986

UNITED STATES PATENT OFFICE 2,467,986

ALTERNATING-CURRENT MOTOR DRIVE AND CONTROL

Eric Pell, Shorewood, and Edwin W. Seeger, Wauwatosa, Wis., assignors to Cutler-Hammer, Inc., Milwaukee, Wis., a corporation of Delaware Application September 23, 1944, Serial No. 555,418

20 Claims. (Cl. 318—203)

This invention relates to improvements in alternating current motor drives and control especially applicable to hoists, although not limited thereto.

In practice difficulty has been experienced in obtaining an alternating current drive and control for hoist service which will afford control of widely varying loads, particularly in lowering, comparable to the control afforded where the drive is of the D. C. type. Various types of A. C. drives and control for such service have been proposed, including drive by an alternating current motor which has its primary unbalanced for lowering, and drive by two motors coordinated for functional results somewhat similar to that of a single motor operating with an unbalanced primary.

The present invention relates particularly to drives of the two motor type, and has among its objects to utilize such motors to greater advantage.

Another object is to provide a two motor drive and to so utilize the same as to afford a wider selection of speed-torque curves than has been afforded by the heretofore proposed drives and controls.

Another object is to provide such a drive and control which will afford the desired high speed operation of a light load in hoisting or lowering and which will measure the load and guard against use of the high speed means under heavy load conditions.

Another object is to provide a control wherein high speed of a light load may be obtained through the medium of either semi-automatic or fully automatic means.

Other objects and advantages of the invention will hereinafter appear.

Certain embodiments of the invention are illustrated in the accompanying drawings which will now be described, it being understood that the embodiments illustrated are susceptible of various modifications without departing from the scope of the appended claims.

In the drawings,

Figure 1 shows diagrammatically a two motor drive, an electrical brake therefor, resistances for the secondary circuits of the motors and certain control instrumentalities;

Fig. 2 shows diagrammatically control means for the control instrumentalities of Fig. 1;

Fig. 3 shows a modification of the control means of Fig. 2, and

Fig. 4 is a chart showing certain characteristic speed torque curves and ranges of certain of the automatic relays of the control means.

Referring to Fig. 1, the drive illustrated comprises a main motor M and an auxiliary motor $M^1$, both being alternating current slip ring motors and having their primaries P and $P^1$ supplied from an alternating current source $L^1$, $L^2$ and $L^3$. The secondaries S and $S^1$ of the two motors are provided with resistance control hereinafter described and are mechanically coupled together and to an electrical brake B, as indicated by the broken line 1. Brake B may be assumed to set when deenergized.

The main motor M is non-reversible and preferably is of a capacity such that it is alone sufficient to lift the average load at the desired speed. The auxiliary motor $M^1$ is a reversible higher speed motor, preferably considerably smaller than the main motor. The auxiliary motor is energized to operate in hoisting direction only to assist the main motor when such assistance become desirable. Otherwise the auxiliary motor is deenergized in hoisting. On the other hand, the auxiliary motor may be used alone for high speed hoisting of a light load, the main motor being open circuited preferably by interruption of its secondary circuit. Both motors are energized for initiating lowering operation, the main motor M continuing to exert a torque in hoisting direction and the auxiliary motor $M^1$ being reversed to exert a torque in lowering direction. Simultaneous energization of the two motors for initiation of lowering is highly desirable to eliminate chance of hoisting by the main motor or run away of a descending load without the restraint of the main motor, the torques of the two motors being proportional for such protection. On the other hand, the main motor in lowering, as in hoisting, may be open circuited for high speed operation of a light load under the control of the auxiliary motor. It has been found quite satisfactory to provide a main motor torque of 67% and an auxiliary motor torque of 40% of the rated full hook load hoisting torque. With the motors so proportioned it is possible to obtain the speed torque curves shown in Fig. 4 which it will be observed are highly satisfactory and comparable to the speed torque curves obtainable with a direct current motor drive. The control means of Figs. 1, 2 and 3 afford the aforementioned control of the two motors and also afford measurement of the load and protection against operation of the auxiliary motor alone except under the proper conditions.

Considering the portion of the control means shown in Fig. 1, the same comprises a triple pole electroresponsive main switch MS interposed between both motors and lines $L^1$, $L^2$ and $L^3$, a knife switch KS being interposed between said main switch and said lines. The switch MS alone completes line connections for the main motor primary P, which connections include the windings of overload switches $OL^1$ and $OL^2$. The line connections for auxiliary motor $M^1$ through the main switch MS are controlled by reversing switches H and L. The switch H establishes connections for operation of motor $M^1$ in hoisting direction while the switch L establishes connections for operation of the motor $M^1$ in lowering direction. One terminal of the auxiliary motor $M^1$ has a permanent connection 10 to one pole of main switch MS, thereby enabling the switches H and L to be of the double pole type for control and reversal of line connections to the other two terminals of the motor, said connections including the windings of overload switches $OL^3$ and $OL^4$. The secondary of main motor M has sets of control resistors R, $R^1$, $R^2$, $R^3$, $R^4$ and $R^5$, each set comprising a resistor for each phase of the secondary circuit. An electroresponsive switch HS is normally closed to connect together the outer terminals of the resistors of set R, this switch being of the double pole type. A similar switch 1A normally short-circuits the resistors R. A normally open two pole electroresponsive switch 2L is provided to short-circuit resistors $R^1$ when said switch is energized and similar switches 2A, 3A and 4A are provided to short-circuit resistors $R^2$, $R^3$ and $R^4$, respectively. A load relay HLR of the normally open type has a set of operating windings c connected between the main motor secondary S and resistors $R^5$, there being a winding for each phase of the secondary circuit. Also a series relay SR of the normally closed type has a set of windings c connected in the secondary circuit of the main motor between resistors $R^2$ and $R^3$, there being a winding for each phase of the secondary circuit. Further the main motor secondary circuit has connected thereto a voltage relay VR of the normally closed type. The winding c of this relay is connected across two terminals of the main motor secondary through a rectifier 14 and said relay has in parallel therewith a condenser 15. The secondary of motor $M^1$ has two sets of resistors $R^6$ and $R^7$, each set comprising a resistor for each phase of the secondary circuit. The resistors $R^7$ are permanently included in circuit, while resistors $R^6$ are subject to short-circuiting by a normally open electroresponsive switch 5A. A load relay LLR of the normally open type has a set of windings c included in circuit between the auxiliary motor secondary $S^1$ and the resistors $R^7$, there being a winding for each phase of the secondary circuit. The brake B has an electroresponsive control switch BR of the triple pole type which connects said brake to the lines $L^1$, $L^2$ and $L^3$ through the main switch MS. Switch MS has sets of auxiliary contacts d and e normally disengaged, and the lowering switch L has similar sets of auxiliary contacts d and e, and a set of normally engaged contacts f, while the hoist switch H has a single set of normally disengaged auxiliary contacts d. Each of switches 1A, 2A and 3A has a single set of normally engaged auxiliary contacts d and each of switches 4A and HS has a single set of normally disengaged auxiliary contacts d.

Considering Fig. 2, it shows all of the windings of the switches of Fig. 1 and the contacts of said switches other than the contacts for the power circuits. Additional elements shown in Fig. 2 include a master switch D of the drum type, a low voltage relay UV, a hoist limit switch HLS, a manual switch PB shown as of the push button type, and timing relays 1CT, 2CT and 3CT. The drum switch D has five hoisting positions, five lowering positions and an intermediate off position, and comprises sets of contacts 16 to 27. The contacts 16 are engaged in the off position while all remaining contacts are disengaged in off position, and all contacts are disengaged in all other positions of the drum except those positions indicated by crosses. Thus for example, contacts 17 are engaged in all hoist positions, and disengaged in all other positions, whereas contacts 16 are engaged in off position and disengaged in all hoisting and all lowering positions of the drum. The relay UV which is provided for low voltage protection has a winding c for connection across lines $L^1$ and $L^3$ through the contacts of overload relays $OL^1$ to $OL^4$, by contacts 16 of the drum when engaged in off position of said drum. Thereupon relay UV responds to engage its contacts d to establish for itself a maintaining circuit independent of the drum contacts 16, as will be apparent, and also to engage its contacts e. The hoist limit switch HLS is of the usual type, being shown in closed position. The push button switch PB which of course may be of other types, has two sets of normally disengaged contacts d and e. The relays 1CT, 2CT and 3CT are of the inductive time element type, each having a time element time incident to release following energization and deenergization thereof. The relay 1CT which has normally disengaged contacts d and normally engaged contacts e, is operable by a winding c. The relay winding is supplied with current from lines $L^1$ and $L^3$ through a rectifier 30 under the control of switches hereinafter set forth and has permanently connected in parallel therewith a resistor r and a condenser 31. The relay 2CT is of a similar type, having normally engaged contacts d and normally disengaged contacts e, the latter being in the circuit of the winding of relay 1CT. The relay 2CT has an operating winding c to be supplied through rectifier 30 and has permanently in parallel therewith a resistor $r^1$ and a condenser 32. The relay 3CT is similar to the relays 1CT and 2CT but has only a single set of contacts d which are normally engaged. The winding c of relay 3CT is also supplied with current through rectifier 30 and has permanently in parallel therewith a resistor $r^2$ and a condenser 33. Preferably an additional resistor $r^3$ and a condenser 34 are connected in parallel with the parallel connected windings of relays 1CT, 2CT and 3CT.

Assuming the line connections to be closed by knife switches 35 and 36 with the drum D in off position, relay UV is energized preparatory to starting and remains energized regardless of the position of the drum, pending an abnormal drop in voltage. Also relays 2CT and 3CT are rendered responsive and relay 2CT in responding acts through its contacts e to render relay 1CT responsive. Thus the contacts e of relay 1CT disengage while its contacts d engage and contacts d of the relays 2CT and 3CT disengage.

Then assuming the drum to be moved to hoist position I, it engages contacts 17 and 19. Contacts 17 complete circuit from line $L^1$ through the closed hoist limit switch HLS and auxiliary contacts f of switch L to and through the winding of the main switch MS to and through the now closed contacts d of relay 1CT and contacts e of relay UV to and through the contacts of the overload relays to line $L^3$. Switch MS connects the main motor to the lines as hereinbefore explained and at the same time drum contacts 19 complete circuit for the winding of switch BR for brake release. As will be apparent, contacts 19 establish circuit from line $L^1$ to and through the winding of switch BR, to and through the closed contacts $e$ of relay UV, and the contacts of the overload relays to line $L^3$. The main motor is thus rendered operative and at this time its secondary circuit includes all resistors except resistors R which are short-circuited by the normally closed switch 1A. Then if the drum be moved to its second hoist position it engages contacts 23 to energize switch 2A, assuming that meanwhile the load measuring relay HLR has responded to the surge of current in the secondary circuit of motor M. One terminal of the winding of switch 2A is connected to line $L^1$ through the drum contacts 23, while the other terminal of said winding is connected to and through the contacts of relay HLR to and through the now closed contacts $e$ of main switch MS to line $L^3$, and switch 2A being thus energized responds to short-circuit the resistors $R^1$ and $R^2$ in the secondary circuit of the main motor for acceleration. Also switch 2A in responding acts through its contacts $d$ to deenergize relay 1CT which tends to effect deenergization of main switch MS. However, main switch MS has meanwhile established through its contacts $d$ a maintaining circuit for itself paralleling the contacts $d$ of relay 1CT, wherefore it is unaffected by release of said relay. Then if the drum be moved to its third position it engages contacts 20 to complete a circuit to the push button switch PB. This circuit will later be explained after describing the action of the controller on further operation of the drum, assuming that push button switch PB is not actuated. Then the drum in its third position effects no change in the control of the large motor, but when the drum is moved to its fourth hoist position it engages contacts 21 to energize the switch 3A for short-circuiting resistors $R^3$ from the secondary circuit of the main motor for further acceleration. The energizing circuit for switch 3A extends from line $L^1$ through drum contacts 21, to and through the winding of said switch, through the now closed contacts $e$ of relay 1CT, assuming expiration of the time element of said relay in releasing, to and through the contacts of series relay SR and the contacts of load relay HLR, to and through contacts $e$ of main switch MS to line $L^3$. Also switch 3A in responding disengages its contacts $d$ to deenergize relay 2CT and if now the drum is moved to its fifth hoist position it engages contacts 22 to energize switch 4A to short-circuit the main motor secondary resistors $R^4$ upon lapse of the time element incident to release of relay 2CT. The energizing circuit for switch 4A extends from line $L^1$ through drum contacts 22 to and through the winding of said switch, to and through contacts $d$ of relay 2CT, to and through the contacts of relays SR and HLR and contacts $e$ of main switch MS to line $L^3$. The main motor then has been subjected to its full range of control. In the fourth position of the drum switch 1A is energized and in the fifth position switch 5A is energized, but without effect on the motors, assuming that push button switch PB is not operated.

With the drum D in the third hoist position and with the push button switch PB operated, drum contacts 20 complete an energizing circuit for switch H, causing switch H to respond to connect in circuit the auxiliary motor $M^1$. More particularly drum contacts 20 complete circuit from line $L^1$ to and through contacts $d$ of the switch PB, to and through the operating winding of switch H, to and through contacts $e$ of relay UV to line $L^3$. Thus by operating the push button switch PB with the drum in its third position the motor $M^1$ may be made to assist the main motor under heavy load conditions, and assuming a heavy load the control of the main motor remains the same as that heretofore described. In other words, the main motor control switches 2A, 3A and 4A will under heavy load conditions operate in response to movement of the drum as aforedescribed, whereas continued depression of the push button switch PB will continue the assistance of the auxiliary motor $M^1$. In the third and fourth positions of the drum motor $M^1$ has all secondary resistance included, but when the drum is moved to its fifth position after effecting in its fourth position energization of main motor control switch 4A, it energizes switch 5A to short-circuit the resistors $R^6$ in the secondary circuit of the auxiliary motor. This completes the range of control for heavy loads.

Assuming the load to be light and the relay HLR to release by the time the drum reaches the fourth hoist position then with push button switch PB held closed the drive will be transferred to the motor $M^1$ alone. The contacts 21 of the drum complete circuit from line $L^1$ to and through the contacts $d$ of switch H to and through contacts $e$ of switch PB, to and through the winding of switch HS, to and through contacts $e$ of main switch MS to line $L^3$. Also the drum in its fourth hoist position engages contacts 25 to establish circuit to and through the winding of switch 1A, to and through contacts $e$ of main switch MS to line $L^3$. Thus switches HS and 1A are energized to interrupt the secondary circuit of the main motor M, leaving the auxiliary motor to alone drive the hoist. Here it will be noted that response of switches HS and 1A interrupt the secondary circuit of the motor because relay HLR in opening insures deenergization of switches 2A, 3A and 4A, as well as switch 2L, the latter not being energized in hoisting. Also it will be noted that with the relay HLR released, movement of the drum to the fifth hoist position will have no effect because opening of relay HLR blocks energization of switch 4A, and switch 4A remaining open blocks energization of switch 5A.

It is desirable to have the relay HLR drop out as close to zero load value as possible, and preferably at a reversed current in the regenerative quadrant. A very desirable relay is one connected to the motor primary through a network to compensate for, or to neutralize, the effect of the exciting component, thus separating the load component for control of the relay, a relay with such a network being disclosed in application Serial No. 552,046, filed August 31, 1944. By over compensation, such relay may be made to drop out in the regenerative quadrant.

It will be noted that series relay SR controls the switches 3A and 4A and through switch 4A controls switch 5A, said relay upon responding preventing response of any of said switches. The purpose of such relay is to delay response of said switches when plugging the master switch in the hoisting direction, until the load is safely reduced.

Assuming movement of the drum D to the first lowering position, it engages contacts 19 to complete the energizing circuit of the brake switch BR, as aforeexplained, and engages contacts 18 to complete an energizing circuit for switch L which responds to establish lowering connections for the auxiliary motor when the main switch MS is closed, this connecting in circuit the main motor also. Energization of the main switch MS is in this instance effected by engagement of the contacts $d$ of switch L, assuming relay 1CT to have been again energized by return of the master switch to off position in going to lowering position. More particularly contacts 18 of drum D establish a connection from line $L^1$ to and through the winding of switch L, to and through contacts $e$ of relay UV and the overload relay contacts to line $L^3$. Also drum contacts 18 establish circuit from line $L^1$ to and through contacts $d$ of switch L to and through the winding of switch MS, to and through contacts $d$ of relay 1CT, contacts $e$ of relay UV and the overload contacts to line $L^3$. Thus both motors are energized and the brake B is released for initiating lowering, whereas response of switch L also completes an energizing circuit for switch 5A, causing said switch to respond to short-circuit resistors $R^6$ from the secondary circuit of the auxiliary motor $M^1$. The energizing circuit for switch 5A extends from drum contacts 18 to and through contacts $e$ of switch L, to and through the winding of switch 5A to line $L^3$, as already traced. Also the drum in the first lowering position through engagement of contacts 23 and 24 completes circuit through the windings of switches 2A and 2L in parallel, to and through the contacts of relay HLR and contacts $e$ of the main switch MS to line $L^3$, causing said switches to respond to exclude from the secondary circuit of the main motor resistors R, $R^1$ and $R^2$. The switches L and 5A remain closed on all points in lowering, providing a high torque of the motor $M^1$, decreasing with the speed of said motor. On the other hand, the torque of motor M increases with speed, and thus the net torque which varies with the difference in torque of the two motors varies at a faster rate than the individual torques, providing a stable speed on all points lowering, as shown in Fig. 4.

If the master switch be moved to the second lowering position it deenergizes switch 2A, reinserting in the secondary circuit of the main motor the resistors $R^2$ and when the drum is moved to its third lowering position it deenergizes switch 2L to reinsert in the secondary circuit of the main motor the resistors $R^1$. Then if the drum is moved to its fourth lowering position it engages contacts 25 to complete the energizing circuit of switch 1A, as aforeexplained, which in responding introduces into the secondary circuit of the main motor the resistors R.

Movement of the drum D to the fifth lowering position has no effect unless the push button switch PB be operated, in which event the drum and said push button switch jointly energize switch HS under light load conditions, such as cause response of load relay LLR associated with motor $M^1$. This energizing circuit for switch HS extends from drum contacts 26 to and through contacts $d$ of relay 3CT, to and through the contacts of relay LLR, to and through contacts $e$ of push button switch PB, to and through the winding of switch HS, to and through contacts $e$ of main switch MS to line $L^3$. As will be understood, the relay LLR opens under heavy load but is responsive under light load and through energization of switch HS opens the secondary circuit of the main motor, leaving the auxiliary motor $M^1$ to alone control the descent of the light load. When the switch HS responds it acts through its contacts $d$ to establish for itself a maintaining circuit, shunting the contacts of relay LLR, said maintaining circuit including the contacts of the voltage relay VR.

Timing relay 3CT which is deenergized by switch 1A when responding in fourth position of the drum allows for acceleration of the motor drive and for drop out of relay LLR in case of a large overhauling load, thus preventing undesired transfer of control in moving drum D from its fourth position to its fifth position. The voltage relay VR further protects against use of the motor $M^1$ alone under heavy load conditions, for in the event of overspeeding this relay will respond and deenergize switch HS for reclosure of the circuit of the main motor, thus supplying hoisting torque to check the lowering speed.

Referring to Fig. 3, it shows certain modifications of the controller heretofore described, to afford high speed operation of light loads without use of the push button switch PB. Also it shows certain further modifications, all without change in the switches of Fig. 1 except that switch 5A controlling the secondary of motor $M^1$ is provided with normally closed main contacts $a$ and $b$ (Fig. 3) instead of normally open main contacts, whereas the series relay has an added set of contacts, the two sets in Fig. 2 being designated $SR^1$ and $SR^2$. The $SR^1$ contacts are the same as those in Fig. 2, while added contacts $SR^2$ are of the normally disengaged type. Fig. 2 omits the push button switch PB and modifies somewhat the drum D and the controlled connections inclusive of auxiliary contacts, as will hereinafter appear. As will be understood, the controllers of Figs. 2 and 3 would be alike except for the changes mentioned and depicted in the partial showing of Fig. 3 wherein the parts corresponding to those of Fig. 2 are given like reference characters.

As in the controller of Fig. 2 the drum D in its first hoisting position engages contacts 17 to energize the winding of the main switch MS and in the second position energizes switch 2A. Then in this case when the drum is moved to its third position it engages contact 20 to energize switch H without any special manual operation, whereby the motor $M^1$ is connected to assist motor M. Then when the drum is moved to its fourth hoist position it engages contacts 21 to energize switch 3A, as in Fig. 2, and also energizes switch HS through contacts $d$ of switch H, it being understood that in the fourth position switch 1A is also energized, as explained in connection with Fig. 2. Thus if in the fourth hoist position the load is light and relay HLR is open to open the control circuits of switches 2A, 3A and 4A, the main motor will have its secondary circuit opened by response of switch HS. On the other hand, if the load is heavy the previously closed accelerating switches will remain closed, keeping the main motor active, and then when the drum $d$ is moved to the fifth hoisting position it will energize switch 4A, as explained in connection with Fig. 2. As the switch 5A associated with the auxiliary motor is in this instance biased to closed position it is arranged for energization when the switch H responds to connect in circuit the auxiliary motor, and to remain energized until the switch 4A responds in the fifth hoist position, whereby switch 5A functions as explained in connection with Fig. 2. Such energization of switch 5A is accomplished by auxiliary contacts $e$ of switch H which jointly with normally engaged auxiliary contacts $e$ of switch 1A connect the winding of switch 5A across the lines through auxiliary contacts of the main switch MS and independently of the drum. On the other hand, switch 5A in responding completes by its auxiliary contacts d a maintaining circuit for itself, shunting the contacts e of switch 1A, such maintaining circuit including normally engaged contacts e of switch 4A.

In lowering, the drum in its first position, as in Fig. 2, engages contacts 18 to energize switch L controlling the auxiliary motor and switch L in turn through engagement of its contacts d energizes main switch MS. Also as in Fig. 2 the drum in its first lowering position energizes switch 2A and also switch 2L, the latter not appearing in Fig. 3, whereas switch 5A remains deenergized to short-circuit the resistors $R^6$ in the secondary circuit of motor $M^1$. Then when the drum is moved to its second lowering position it deenergizes switch 2A, and when moved to its third lowering position deenergizes switch 2L, as in Fig. 2. Also as in Fig. 2, the drum in its fourth lowering position energizes switch 1A, not shown in Fig. 3, and in its fifth lowering position energizes switch HS provided the load is light and relay LLR engages its contacts.

In Fig. 3 the drum contacts 23 controlling switch 2A are engaged in the off position of the drum instead of being disengaged, as in Fig. 2. Also the drum of Fig. 3 has contacts $18^a$ which are engaged in the off and first lowering positions of the drum, to parallel the contacts 18 of the drum through the contacts $SR^2$ of series relay SR in the secondary circuit of the main motor. Thus provision is made for maintaining connections for dynamic braking if the drum is returned to off position while the series relay is sufficiently energized to keep its contacts $SR^2$ engaged, said relay ultimately interrupting the circuit controlled by drum contacts $18^a$.

What we claim as new and desire to secure by Letters Patent is:

1. The method of controlling through the medium of an A. C. main motor and an A. C. auxiliary motor coupled together, widely varying loads to be moved in reverse directions selectively as in hoisting and lowering, which comprises energizing the main motor for unidirectional torque thereof irrespective of the direction in which the load is to be moved and energizing the auxiliary motor for torque in reverse directions selectively for selectively assisting the main motor when the load is to be moved in one direction and for bucking the main motor when the load is to be moved in the reverse direction.

2. The method of controlling through the medium of an A. C. main motor and an A. C. auxiliary motor coupled together, widely varying loads to be moved in reverse directions selectively as in hoisting and lowering, which comprises energizing the main motor for unidirectional torque thereof irrespective of the direction in which the load is to be moved, energizing and accelerating the main motor alone when starting the load in one direction and then energizing the auxiliary motor to assist the main motor, and which comprises for reverse operation of the load energizing both motors with the torque of the auxiliary motor reversed to buck the main motor.

3. The method of controlling through the medium of an A. C. main motor and a smaller but higher speed A. C. auxiliary motor coupled together, widely varying loads to be moved in reverse directions selectively as in hoisting and lowering, which comprises energizing the main motor for unidirectional torque thereof whenever the load is to be moved in either direction and energizing the auxiliary motor for torque in reverse directions selectively for selectively assisting the main motor when the load is to be moved in a certain direction and bucking the main motor when the load is to be moved in the reverse direction, and which also comprises deenergizing the main motor under light load conditions while maintaining the auxiliary motor energized, thereby to transfer the load to the auxiliary motor.

4. The method of controlling through the medium of an A. C. main motor and a smaller but higher speed A. C. auxiliary motor coupled together, widely varying loads to be moved in reverse directions selectively as in hoisting and lowering, which comprises energizing the main motor for unidirectional torque thereof whenever the load is to be moved in either direction and energizing the auxiliary motor for torque in reverse directions selectively for selectively assisting the main motor when the load is to be moved in a certain direction and bucking the main motor when the load is to be moved in the reverse direction, and which also comprises effecting for movement of the load in the first mentioned direction energization and secondary resistance control of the main motor before energizing the auxiliary motor to assist the main motor and effecting for movement of the load in the reverse direction substantially simultaneous energization of both motors and subsequent control for increase in the bucking effect of the auxiliary motor.

5. The method of controlling through the medium of an A. C. main motor and a smaller but higher speed A. C. auxiliary motor coupled together, widely varying loads to be moved in reverse directions selectively as in hoisting and lowering, which comprises energizing the main motor for unidirectional torque thereof whenever the load is to be moved in either direction and energizing the auxiliary motor for torque in reverse directions selectively for selectively assisting the main motor when the load is to be moved in a certain direction and bucking the main motor when the load is to be moved in the reverse direction, and which also comprises effecting for movement of the load in the first mentioned direction energization and secondary resistance control of the main motor before energizing the auxiliary motor to assist the main motor, effecting for movement of the load in the reverse direction substantially instantaneous energization of both motors and subsequent control for increase in the bucking effect of the auxiliary motor, and effecting for high speed drive of light loads deenergization of the main motor while maintaining the auxiliary motor energized.

6. The combination with an A. C. motor drive for widely varying loads to be moved in reverse directions selectively and comprising main and auxiliary motors coupled together, of control means providing for energization of said main motor for unidirectional torque thereof regardless of the direction in which the load is to be moved and providing for energization of said auxiliary motor to assist said main motor for movement of the load in one direction, or alternatively to buck said main motor for movement of the load in reverse direction.

7. The combination with an A. C. motor drive for widely varying loads to be moved in reverse directions selectively and comprising main and auxiliary motors coupled together, said main motor being individually capable of driving a substantial load and said auxiliary motor being individually capable of driving a light load, and control means providing for energization of said main motor for unidirectional torque thereof regardless of the direction in which the load is to be moved and providing for energization of said auxiliary motor for torque thereof in reverse directions selectively according to the direction in which the load is to be moved, said control means including means to enable use of said motors individually for the aforesaid purposes.

8. The combination with an A. C. motor drive for widely varying loads to be moved in reverse directions selectively and comprising main and auxiliary motors coupled together, said main motor being individually capable of driving a substantial load, and said auxiliary motor being individually capable of driving a light load, and control means providing for energization of said main motor for uinidirectional torque thereof regardless of the direction in which the load is to be moved and providing for energization of said auxiliary motor for torque thereof in reverse directions selectively according to the direction in which the load is to be moved, said control means including means to enable use of said motors individually for the aforesaid purposes but insuring energization of said main motor when initiating movement of the load in either direction.

9. The combination with an alternating current drive for widely varying loads to be moved in reverse directions selectively and comprising main and auxiliary motors coupled together, said main motor being individually capable of driving a substantial load and said auxiliary motor being individually capable of driving a light load at a higher speed than is otherwise obtainable by said drive, and control means providing for energization of said main motor for unidirectional torque thereof irrespective of the direction in which the load is to be moved, and providing for energization of said auxiliary motor and for torque reversal thereof at will, said control means comprising means affording at will energization of said main motor alone for movement of the load in one direction and subsequently affording for continued movement of the load in the same direction energization of said auxiliary motor and also electrical disconnection of said main motor but only under light load conditions.

10. The combination with an A. C. motor drive for widely varying loads to be moved in reverse directions selectively and comprising main and auxiliary motors coupled together, said main motor being individually capable of driving a substantial load, of control means providing for energization of said main motor for unidirectional torque thereof irrespective of the direction in which the load is to be moved, and providing for energization of said auxiliary motor to assist said main motor for movement of the load in one direction and to buck said main motor when the load is to be moved in the reverse direction, said control means comprising means which for movement of the load in the first mentioned direction affords energization of both motors, or alternatively energization of only said main motor.

11. The combination with an A. C. motor drive for widely varying loads to be moved in reverse directions selectively and comprising main and auxiliary motors coupled together, said main motor being individually capable of driving a substantial load, of control means providing for energization of said main motor for unidirectional torque thereof irrespective of the direction in which the load is to be moved, and providing for energization of said auxiliary motor to assist said main motor for movement of the load in one direction and to buck said main motor when the load is to be moved in the reverse direction, said control means comprising means which for movement of the load in the first mentioned direction affords energization of both motors or alternatively energization of only said main motor, and further comprising means which affords energization of both motors when initiating movement of the load in a reverse direction.

12. The combination with an A. C. motor drive for widely varying loads to be moved in opposite directions selectively and comprising main and auxiliary motors coupled together, said auxiliary motor being individually capable of driving a light load at a relatively high speed, of control means providing for energization of said main motor for unidirectional torque thereof irrespective of the direction in which the load is to be moved, and providing for energization of said auxiliary motor selectively to assist or buck said main motor, said control means comprising load measuring means under the control of which said main motor is electrically disconnectible to afford drive of a light load by said auxiliary motor alone.

13. The combination with an A. C. motor drive for widely varying loads to be moved in opposite directions selectively and comprising main and auxiliary motors coupled together, said auxiliary motor being individually capable of driving a light load at a relatively high speed, of control means providing for energization of said main motor for unidirectional torque thereof irrespective of the direction in which the load is to be moved, and providing for energization of said auxiliary motor selectively to assist or buck said main motor, said control means comprising load measuring means under the control of which said main motor is electrically disconnectible to afford drive of a light load by said auxiliary motor alone when the load is being moved in either direction.

14. The combination with an A. C. motor drive for widely varying loads to be moved in opposite directions selectively and comprising main and auxiliary motors coupled together, said auxiliary motor being individually capable of driving a light load at relatively high speed, of control means providing for energization of said main motor for unidirectional torque thereof irrespective of the direction in which the load is to be moved and providing for energization of said auxiliary motor selectively to assist or buck said main motor, said control means comprising means insuring energization of said main motor when initiating movement of the load in either direction and also comprising load measuring means under the control of which said main motor is electrically disconnectible under light load conditions only, to shift the load on to said auxiliary motor alone.

15. The combination with an A. C. motor drive for widely varying loads to be moved in opposite directions selectively, and comprising main and auxiliary motors coupled together, said auxiliary motor being individually capable of driving a light load at relatively high speed, of control means providing for energization of said main motor for unidirectional torque thereof irrespective of the direction in which the load is to be moved and providing for energization of said auxiliary motor selectively to assist or buck said main motor, said control means comprising load measuring means under the control of which said main motor is electrically disconnectible to afford drive of a light load by said auxiliary motor alone, and further comprising means affording at will continued energization of said main motor independently of said load measuring means.

16. The combination with an A. C. motor drive for widely varying loads to be moved in reverse directions selectively and comprising a main motor and an auxiliary motor coupled together, of control means comprising means common to the primary circuits of said motors to supply power thereto and reversing means individual to the primary circuit of said auxiliary motor, thereby to afford energization of said main motor whenever said auxiliary motor is initially energized and to provide always a unidirectional torque for said main motor while rendering the torque of said auxiliary motor reversible selectively to assist or buck said main motor according to the direction in which the load is to be moved.

17. The combination with an alternating current motor drive for widely varying loads to be moved in reverse directions selectively and comprising a main motor and an auxiliary motor coupled together, of control means comprising means common to the primary circuits of said motors to supply power thereto and reversing means individual to the primary circuit of said auxiliary motor, thereby to afford energization of said main motor whenever said auxiliary motor is initially energized and to provide always a unidirectional torque for said main motor while rendering the torque of said auxiliary motor reversible selectively to assist or buck said main motor according to the direction in which the load is to be moved, and said control means also comprising means to interrupt the secondary circuit of said main motor for transfer of the load to said auxiliary motor alone.

18. The combination with an A. C. motor drive for widely varying loads to be moved in reverse directions selectively and comprising a main motor and an auxiliary motor coupled together, of control means for the primary circuits of said motors comprising a main switch common to said circuits and reversing switches for the primary circuit of said auxiliary motor, thereby to afford energization of said main motor whenever said auxiliary motor is initially energized and to provide always a unidirectional torque for said main motor while rendering reversible the torque of said auxiliary motor selectively to assist or buck said main motor, and said control means also comprising means affording for operation of the load in one direction under heavy load conditions energization of the main motor alone or of both motors and under light load conditions with both motors energized, affording electrical disconnection of said main motor by interrupting its secondary circuit.

19. The combination with an A. C. motor drive for widely varying loads to be moved in reverse directions selectively and comprising a main motor and an auxiliary motor coupled together, of control means for the primary circuits of said motors comprising a main switch common to said circuits and reversing switches for the primary circuit of said auxiliary motor, thereby to afford energization of said main motor whenever said auxiliary motor is initially energized and to provide always a unidirectional torque for said main motor while rendering reversible the torque of said auxiliary motor selectively to assist or buck said main motor, and said control means also comprising means affording for operation of the load in one direction under heavy load conditions, energization of the main motor alone or of both motors, and under light load conditions with both motors energized, affording electrical disconnection of said main motor by interrupting its secondary circuit when the load is being moved in either direction.

20. The combination with an A. C. motor drive for widely varying loads to be moved in reverse directions, as in hoisting and lowering, and comprising main and auxiliary motors coupled together, of control means including a master switch having an off position, said control means being responsive to said master switch to effect energization of the main motor for unidirectional torque thereof irrespective of the direction in which the load is to be moved and to effect energization of said auxiliary motor selectively to assist said main motor as in hoisting or to buck said main motor as in lowering, and means associated with said master switch to effect upon return of said master switch to off position while said drive is being overhauled by the load as in lowering, maintaining of certain circuits of said drive until the load is brought substantially to rest and then interrupting said circuits automatically.

ERIC PELL.
EDWIN W. SEEGER.

REFERENCES CITED

The following references are of record in the file of this patent:

UNITED STATES PATENTS

| Number | Name | Date |
| --- | --- | --- |
| 774,018 | Wutz-Kunz | Nov. 1, 1904 |
| 1,810,821 | Eck | June 16, 1931 |
| 2,193,683 | Beck | Mar. 12, 1940 |
| 2,312,592 | Seeger et al. | Mar. 2, 1943 |